May 25, 1965  G. NAVARRO  3,185,260
VEHICLE SUSPENSIONS
Filed July 24, 1964  2 Sheets-Sheet 1

May 25, 1965 G. NAVARRO 3,185,260
VEHICLE SUSPENSIONS
Filed July 24, 1964 2 Sheets-Sheet 2
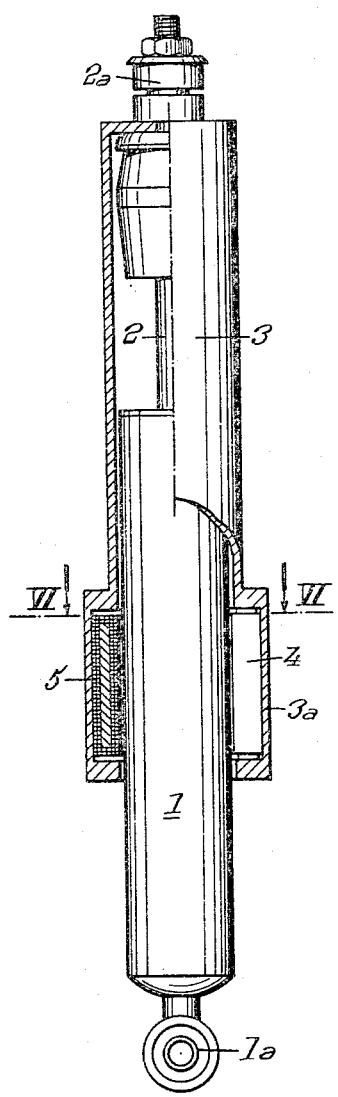
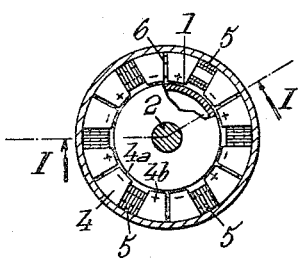
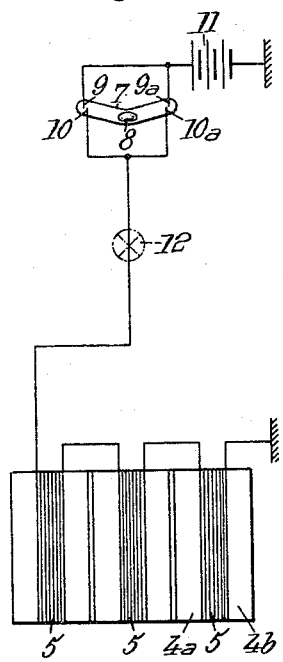

United States Patent Office 3,185,260
Patented May 25, 1965

3,185,260
VEHICLE SUSPENSIONS
Gustave Navarro, 1 Rue Dalpozzo, Nice, France
Filed July 24, 1964, Ser. No. 384,855
Claims priority, application France, July 25, 1963,
7,257, Patent 1,364,500
8 Claims. (Cl. 188—86)

The present invention is concerned with a suspension for a vehicle, and in particular an automobile vehicle, which comprises a stabilizer intended to prevent the vehicle suspended portion from taking too great a lateral inclination when the vehicle is negotiating a curve.

The object of my invention is to provide a suspension which is better adapted to meet the requirements of practice than those known up to this time.

My invention is concerned with vehicle suspensions of the type comprising a shock absorber having two elements, to wit a cylinder and a piston slidable in said cylinder, one of said elements being connected to a wheel vehicle and the other to the suspended portion thereof, and an electromagnetic brake for preventing sliding longitudinal displacements of said two elements with respect to each other, said electromagnetic brake being operative by the centrifugal force acting on the vehicle in a curve.

According to the present invention, said electromagnetic brake includes jaw means slidable longitudinally on the external surface of said cylinder and carried by said piston so as to be held in fixed longitudinal position with respect thereto but to be movable transversely with respect to said piston so as to be strongly applied against said cylinder other face when operated by said centrifugal force responsive means.

According to another feature of my invention, which is applicable preferably in the above mentioned case but applies to all cases where two elements slidable with respect to each other (not necessarily a shock absorber cylinder and a piston slidable in said cylinder) carried respectively by a vehicle wheel and the suspended portion of said vehicle, the brake consists of at least one U-shaped electromagnet mounted on one of the elements so as to be fixed with respect thereto in the direction of the sliding displacement but to have a freedom of movement transversely to this direction, the other element being made of a ferromagnetic material so that the terminals of the electromagnet are strongly applied against said ferromagnetic element when the electromagnet is energized by centrifugal force responsive means.

Preferred embodiments of my invention will be hereinafter described with reference to the appended drawings, given merely by way of example, and in which.

Figure 3:
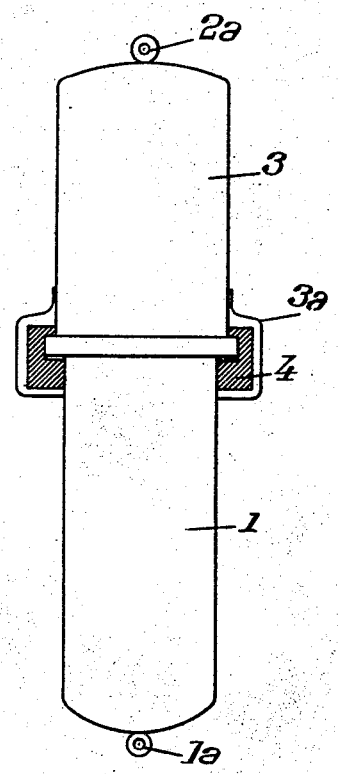
FIG. 3 is a view similar to FIG. 1 and corresponding to a modification.
Figure 4:
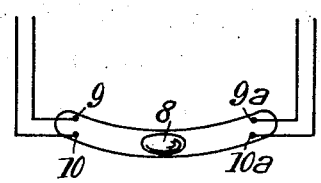

FIG. 4 diagrammatically shows the means responsive to the centrifugal force for operating the device;

FIG. 5 is an elevational view, partly in section, of a construction corresponding to the embodiment of FIG. 3;

FIG. 6 is a cross sectional view on the line VI—VI of FIG. 5; and

FIG. 7 illustrating the electric connections in a device according to FIGS. 5 and 6.

Figure 1:
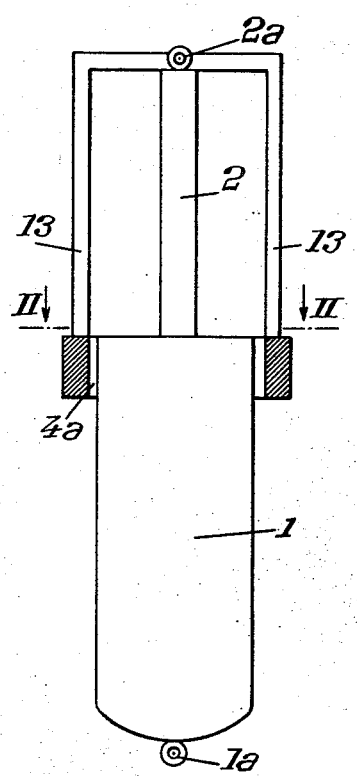
FIG. 1 is a diagrammatical view showing a first embodiment of my invention in elevational view, with parts in section.
Figure 2:
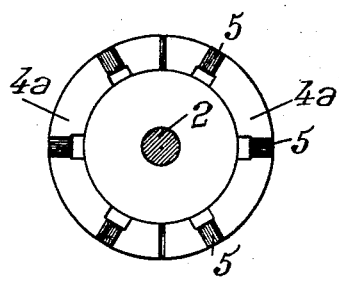
FIG. 2 is a cross section on the line II—II of FIG. 1.

In the construction diagrammatically illustrated by FIG. 1, the piston moving in the cylinder 1 of the shock absorber is connected through a rod 2 to the frame of the vehicle through a connection 2a. The cylinder 1 is connected at 1a to a vehicle wheel. A stirrup-shaped member 13 pivotally connected at 2a to the vehicle frame carries electromagnetic jaws 4a slidable along cylinder 1 and movable transversely with respect thereto, such jaws being visible in FIG. 2.

In the embodiment of FIG. 3 the piston of the shock absorber is rigid with a cylindrical cover 3 surrounding cylinder 1 and slidable with respect thereto. The electromagnetic jaws 4 are slidable transversely in a casing 3a fixed to said cover 3.

Current is sent through windings 5 by a switch such as shown at 8-9-10-9a and 10a operative by the centrifugal force developed when the vehicle is negotiating a curve.

The construction illustrated by FIGS. 5 to 7 is similar to that of FIG. 3. Cylinder 1 is made of a ferromagnetic material and the electromagnetic brake comprises electromagnets which are fixed longitudinally with respect to cover 3 but are movable transversely with respect thereto in housing 3a, which is advantageously made of a non-magnetic material such as aluminum. Preferably the whole of cover 3 is made of a non-magnetic material. The core of every electromagnet is U-shaped in cross section (FIG. 6) and the ends of said core constitute pole pieces 4a and 4b which are strongly applied against the outer surface of cylinder 1, thus braking the displacements of rod 2 with respect to cylinder 1, when the windings 5 of the electromagnets are energized by an electric current flowing through a circuit closed by a switch responsive to the centrifugal force developed when the vehicle is negotiating a curve. It should be noted that even when the electro-magnets are not energized the air gap between the pole pieces 4a-4b of the electromagnets and the outer wall of cylinder 1 may be extremely small and even equal to zero. In this latter case, there exists, between the electromagnet pole pieces and the outer wall of cylinder 1, a slight friction as long as the electromagnets are not energized, such a friction being not capable of interfering with the relative movements of the piston and of the cylinder of the shock absorber.

The spires of windings 5 extend in planes which are, at least approximately, parallel to radial planes of cylinder 1.

Advantageously the adjacent terminals of two electromagnets adjoining each other have opposed polarities as indicated by FIG. 6.

Preferably the electromagnets have a dimension in the direction of the axis of cylinder 1 which is a multiple of their width. I thus obtain important contact surfaces between cylinder 1 and the electromagnet pole pieces without substantially increasing the dimensions of the shock absorber.

Advantageously, as shown, I provide a plurality of electromagnets 4, separated from one another by small plates 6 of a non-magnetic material and in particular of a compressible material, for instance a plastic one, these electromagnets 4 forming a circular row which surrounds cylinder 1.

Concerning the centrifugal force responsive switch which closes the energizing circuit of windings 5 when the vehicle is negotiating a curve, it may be made in different manners. For instance it might consist of a pendulum (not shown) adapted to close the energizing circuit when it is moved in either direction from its vertical position. It may also consist, as shown by FIG. 3, of a tubular bulb 7 in the form of a U or of a V with a very great angle between its branches, containing a drop of mercury 8 which, under the effect of the centrifugal force, can move up in either of the branches of bulb 7 so as to close the contacts 9 and 10 or 9a and 10a of the switch.

FIG. 7 shows the mounting of switch 7 between battery 11 and the windings 5 of the electromagnets 4. In the energizing circuit, one of the ends of which is earthed, there may be inserted a lamp 12 which permits of ascertaining whereas the stabilizer is working. Owing to the fact that cylinder 1 is made of a ferromagnetic material, the magnetic circuit closes through the wall of said cylinder which gives rise to a particularly intensive magnetic effect.

Of course, I might mount on every wheel of the vehicle a shock absorber combined with the stabilizer according to the present invention, all the stabilizers being preferably controlled by the same switch. However, since the stabilizer is working whether the centrifugal force is directed toward the right or toward the left, it may be sufficient to provide stabilizers on only one side of the vehicles and I may even use an angle stabilizer.

The stabilizer according to the present invention has many advantages. It is not only simple and efficient but easy to fit on existing shock absorber.

In a general manner, while I have in the above description disclosed what I deem to be practical and efficient embodiments of my invention, it should be well understood that I do not wish to be limited thereto as there might be changes made in the arrangement, disposition and form of the parts without departing from the principle of the present invention as comprehended within the scope of appended claims.

What I claim is:

1. For use on an automobile vehicle including two elements, respectively, a wheel and a suspended unit, movable vertically with respect to each other, the combination of a shock absorber including a cylinder fixed to one of said elements and a piston slidable in said cylinder and fixed to the other of said elements, an electromagnetic brake including at least two jaws slidable longitudinally on the external surface of said cylinder, means carried by said piston for supporting said jaws in a fixed longitudinal position, but with a possibility of transverse movement, with respect to said piston, and means responsive to the centrifugal force developed by a turn of said vehicle for en- energizing said electromagnetic brake to apply said jaws against said cylinder.

2. For use on an automobile vehicle including two elements, respectively, a wheel and a suspended unit, movable vertically with respect to each other, the combination of an extensible structure including two parts, a first one and a second one, slidable with respect to each other, one of said parts being fixed to one of said elements and the other part to the other of said elements, an electromagnetic brake including at least one electromagnet, said electromagnet including a ferromagnetic core and a winding, said core being U-shaped in section by planes perpendicular to the direction in which said parts are slidable with each other, said core being slidable longitudinally on the external surface of said first part, said first part being made of a ferromagnetic material so as to form, together with said core, a magnetic circuit, means carried by the second of said parts for supporting said core in a position fixed longitudinally with respect to said second part, but with a freedom of movement in the transverse direction, with respect to said second part, whereby it can be applied tightly against said first part and means responsive to the centrifugal force developed by a turn of said vehicle for energizing said winding to apply said core against said first part.

3. For use on an automobile vehicle including two elements, respectively a wheel and a suspended unit, movable vertically with respect to each other, the combination of a shock absorber including a cylinder fixed to one of said elements and a piston slidable in said cylinder and fixed to the other of said elements, an electromagnetic brake including at least one electromagnet, said electromagnet including a ferromagnetic core and a winding, said core being U-shaped in section by planes perpendicular to the axis of said cylinder, said core being slidable longitudinally on the external surface of said cylinder, said cylinder being made of a ferromagnetic material so as to form, together with said core, a magnetic circuit, means carried by said piston for supporting said core in a fixed longitudinal position, but with a freedom of movement in the transverse direction, with respect to said piston, whereby it can be applied tightly against said cylinder, and means responsive to the centrifugal force developed by a turn of said vehicle for energizing said winding to apply said core against said cylinder.

4. For use on an automobile vehicle including two elements, respectively a wheel and a suspended unit, movable vertically with respect to each other, the combination of a shock absorber including a cylinder fixed to one of said elements and a piston slidable in said cylinder and fixed to the other of said elements, an electromagnetic brake including a plurality of electromagnets forming a row surrounding said cylinder, each of said electromagnets including a ferromagnetic core and a winding, said core being U-shaped in section by planes perpendicular to the axis of said cylinder, said core being slidable longitudinally on the external surface of said cylinder, said cylinder being made of a ferromagnetic material so as to form, together with said core, a magnetic circuit, means carried by said piston for supporting said core in a fixed longitudinal position, but with a freedom of movement in the transverse direction, with respect to said piston, whereby it can be applied tightly against said cylinder, and means responsive to the centrifugal force developed by a turn of said vehicle for energizing said winding to apply said core against said cylinder.

5. A combination according to claim 4 wherein said electromagnets have a longitudinal dimension equal to several times their width.

6. A combination according to claim 4 wherein said electromagnets are disposed to form a circular row around said cylinder.

7. A combination according to claim 4 wherein the winding of each of said electromagnets has its spires located substantially in radial planes of said cylinder.

8. A combination according to claim 4 which comprises a casing of a non-magnetic material rigid with said piston and surrounding said row of electromagnets.

No references cited.

ARTHUR L. LA POINT, *Primary Examiner.*